United States Patent [19]

Bedard

[11] Patent Number: 5,449,450
[45] Date of Patent: Sep. 12, 1995

[54] HYDROCARBON CONVERSION PROCESS USING A CRYSTALLINE MICROPOROUS METALLO-ZINC PHOSPHATE COMPOSITION

[75] Inventor: Robert L. Bedard, Fishkill, N.Y.

[73] Assignee: UOP, Des Plaines, Ill.

[21] Appl. No.: 166,845

[22] Filed: Dec. 15, 1993

Related U.S. Application Data

[63] Continuation-in-part of Ser. No. 866,937, Apr. 10, 1992, Pat. No. 5,302,362.

[51] Int. Cl.$^6$ .................. C10G 11/02; C10G 35/06; C10G 47/02; C10G 45/04
[52] U.S. Cl. .................. 208/46; 208/109; 208/110; 208/111; 208/112; 208/113; 208/114; 208/134; 208/143; 208/213; 208/251 H; 208/254 H; 585/275; 585/418; 585/422; 585/466; 585/467; 585/480; 585/528; 585/629; 585/661; 585/667; 585/721; 585/740
[58] Field of Search .................. 208/46, 109, 110, 111, 208/112, 134, 143, 113, 114, 213, 251 H, 254 H; 585/275, 418, 422, 466, 467, 480, 528, 629, 661, 667, 721, 740

[56] References Cited

U.S. PATENT DOCUMENTS

| | | | |
|---|---|---|---|
| 4,061,724 | 12/1977 | Grose et al. | 423/335 |
| 4,310,440 | 1/1982 | Wilson et al. | 252/435 |
| 4,398,926 | 8/1983 | Doshi | 55/16 |
| 4,440,871 | 4/1984 | Lok et al. | 502/214 |
| 4,567,029 | 1/1986 | Wilson et al. | 423/306 |
| 4,589,888 | 5/1986 | Hiscock et al. | 55/26 |
| 4,723,966 | 2/1988 | Fuderer | 55/26 |
| 4,853,197 | 8/1989 | Wilson et al. | 423/306 |
| 4,880,761 | 11/1989 | Bedard et al. | 502/215 |
| 5,015,796 | 5/1991 | Slaugh et al. | 585/436 |
| 5,126,120 | 6/1992 | Bedard | 423/46 |
| 5,186,814 | 2/1993 | Bedard | 208/46 |

OTHER PUBLICATIONS

M. T. Averbuch-Pouchot & A. Kuriff in *Applied Crystallography* No. 7, p. 403 (1974).
T. Barbou des Courieres & M. H. Simonot–Grange in *Materials Research Bulletin*, 12, pp. 355–360 (1977).
O. V. Yakubovich and O. K. Mel'nikov in *Sov. Phys. Crystallogr.* 34(1) (1989).
I. Tordjman et al. in *Acta. Cryst.*, B31, 1143 (1975).
A. W. Frazier et al., *J. Agr. Food Chemistry*, 14, pp. 522–529 (1966).
Gler and Stucky, *Nature*, 349, 508–510 (1991).
Harrison et al. in *Chem. Mater.*, 3, 27–29 (1991).
Nenoff et al, *J. Am. Chem. Soc.*, 113, 378–379 (1991).
Gler et al., *Angew. Chem. Intl. Ed. Engl.*, 30(9), 1169–1171 (1991).
D. W. Breck, *Zeolite Molecular Sieves*, John Wiley and Sons (1974) p. 636.
H. Pines, *The Chemistry of Catalytic Hydrocarbon Conversions*, Academic Press (1981), pp. 123–154.

*Primary Examiner*—Asok Pal
*Assistant Examiner*—Walter D. Griffin
*Attorney, Agent, or Firm*—Thomas K. McBride; Eugene I. Snyder; Frank S. Molinaro

[57] ABSTRACT

Hydrocarbon conversion processes are described which use novel microporous compositions. These compositions have a three-dimensional microporous framework structure of $ZnO_2$, $PO_2$ and $M'O_2$ tetrahedral units, and an intracrystalline pore system. The M' metal is selected from the group consisting of magnesium, copper, gallium, aluminum, germanium, cobalt, chromium, iron, manganese, titanium and mixtures thereof. Examples of the hydrocarbon conversion processes include hydrocracking, hydrotreating and hydrogenation.

13 Claims, No Drawings

HYDROCARBON CONVERSION PROCESS USING A CRYSTALLINE MICROPOROUS METALLO-ZINC PHOSPHATE COMPOSITION

CROSS REFERENCE TO RELATED APPLICATION

This application is a continuation-in-part of prior application Ser. No. 07/866,937, filed on April 10, 1992, now U.S. Pat. No. 5,302,362 which is incorporated by reference.

FIELD OF THE INVENTION

This invention relates to a hydrocarbon conversion process using novel microporous compositions. The compositions have a three-dimensional microporous framework structure of $ZnO_2$, $PO_2$ and $M'O_2$ tetrahedral units, where M' includes metals such as magnesium, copper, gallium and germanium.

BACKGROUND OF THE INVENTION

Zeolites are crystalline aluminosilicate molecular sieves which have a microporous three-dimensional framework structure. In general, the crystalline zeolites are formed from corner-sharing $AlO_2$ and $SiO_2$ tetrahedra and are characterized by having pore openings of uniform dimensions, having a significant ion-exchange capacity and being capable of reversibly desorbing an adsorbed phase which is dispersed throughout the internal voids of the crystal without significantly displacing any atoms which make up the permanent crystal structure.

Zeolites can be represented on an anhydrous basis, by the empirical formula

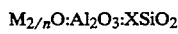

$$M_{2/n}O:Al_2O_3:XSiO_2$$

where M is a cation having the valence n, X is generally equal to or greater than 2. In naturally occurring zeolites, M can be Li, Na, Ca, K, Mg and Ba. The M cations are loosely bound to the structure and frequently can be completely or partially replaced with other cations by conventional ion exchange techniques. Currently over 150 species of both naturally occurring and synthetic zeolites are known.

Other crystalline microporous compositions are known which are not zeolitic, i.e., do not contain $AlO_2$ tetrahedra as essential framework constituents, but which exhibit the ion-exchange and/or adsorption characteristics of the zeolites. These include 1) a pure silica polymorph, silicalite, having a neutral framework containing neither cations nor cation sites as disclosed in the U.S. Pat. No. 4,061,724; 2) crystalline aluminophosphate compositions disclosed in U.S. Pat. No. 4,310,440; 3)silicon substituted aluminophosphates as disclosed in U.S. Pat. No. 4,440,871; 4) metal substituted aluminophosphates as disclosed in U.S. Pat. No. 4,853,197; and 5) metal sulfide molecular sieves disclosed in U.S. Pat. No. 4,880,761.

Applicant has discovered a new class of molecular sieves based on tetrahedra of zinc, phosphorus and at least one other metal. These compositions have a three-dimensional microporous framework, a high framework charge and a high charge gradient which arises from the $Zn^{+2}$, $P^{+5}$ and $M'^{+n}$ (n=+2, +3 or +4) tetrahedral sites in the framework. This class of compositions are capable of ion exchange, adsorption of gases and are useful as catalysts.

There are a number of reports dealing with the synthesis and characterization of zinc phosphate materials. For example the crystal structure of $Zn_2HK(PO_4)_2 \cdot 2H_2O$ has been reported by M. T. Averbuch-Pouchot and A. Durif in *J. Applied Crystallography*, No. 7, p. 403 (1974). Further, the properties of $KZn_2H(PO_4)_2 \cdot 2.5H_2O$ has been reported by T. Barbou des Courieres and M. H. Simonot-Grange in *Materials Research Bulletin*, Volume 12, pp. 355-360 (1977). In this article the authors report that the zinc phosphate material contains water molecules which have partially zeolitic properties. However, heating of this material at temperatures of about 450° C. results in a collapse of the structure. More importantly, the structure of this material was determined by I. Tordjman et al. in Acta Cryst. B31, 1143 (1975) and showed that two of the zinc atoms in the unit cell were not tetrahedrally coordinated (See Table 4, pp. 1147-48). Therefore, this material does not have a framework made up of tetrahedrally coordinated zinc and phosphorus atoms. Other references include the crystal structure of $(Na, K)(ZnPO_4)$ by O. V. Yakubovich and O. K. Mel'nikov in *Sov. Phys. Crystallogr.*, 34(1) (1989) and A. W. Frazier et al. in *J. Agr. Food Chemistry*, Volume 14, page 522-529 (1966). However, both of the materials reported in these references are dense phase materials with the former reference stating that their material has a β-tridymite structure.

There are also several references which disclose the synthesis and characterization of microporous zinc phosphate compositions. Gier and Stucky in *Nature*, 349, 508-510 (1991) disclose the synthesis of zinco (beryllo)-phosphate and arsenate molecular sieves. Harrison et al. in *Chem. Mater*, 3, 27-29 (1991) disclose the preparation of zinc phosphate and beryllium phosphate molecular sieves having the zeolite X structure. The synthesis and characterization of zinc phosphate and beryllium phosphate molecular sieves with the sodalite structure has been reported by Nenoff et al. in *J. Am. Chem. Soc.*, 113, 378-379 (1991). Gier et al. in *Angew. Chem. Intl. Ed. Engl.*, 30 (9), 1169-1171 (1991) disclose and characterize lithium haloberyllophosphate and arsenate molecular sieves.

At this point it is helpful to discuss the difference between "microporous" materials and "dense phase" materials. Microporous materials are materials which have an intracrystalline pore system. The pores are large enough to admit various gaseous or liquid molecules. One example of microporous materials are zeolites. Zeolites contain cations which are found in the intracrystalline pore system of the zeolite and are hydrated. Therefore, a traditional criterion for microporosity is the presence of intracrystalline waters of hydration which are associated with cations found in the pores, i.e., structure directing cations.

Microporous materials are metastable with respect to solid state or dense phases. What this means is that all microporous materials, as a consequence of their metastable nature, will display either a structure collapse or a structure collapse followed by a recrystallization to a dense phase before the melting temperature is reached.

Dense phase materials on the other hand do not have an intracrystalline pore system which is capable of admitting gaseous or liquid molecules. Although in certain crystallographic views, these dense materials may appear to have intracrystalline pore systems, these pores are only large enough to accommodate a small cation without any waters of hydration. That is, the cation is actually coordinated to the framework oxygen atoms. Further, dense phase materials will not undergo a complete structure collapse before melting occurs.

Applicant's compositions differ in several ways from the materials described in the references above. First, applicant's compositions have zinc, phosphorus and one or more other metal in the framework. That is, these compositions have a three-dimensional microporous framework of $ZnO_2$, $PO_2$ and $M'O_2$ tetrahedral units. Illustrative of these M' metals are: magnesium, copper, gallium, aluminum and germanium.

It should be pointed out that molecular sieves containing Al, P and Zn have been disclosed in U.S. Pat. No. 4,567,029. Applicant's compositions differ from those disclosed in the '029 patent in that applicant's compositions contain alkali metals whereas the '029 compositions do not. The amount of aluminum in applicant's composition is outside the range disclosed by the '029 reference. Finally, the structure of applicant's composition is different from those disclosed in the '029 reference.

SUMMARY OF THE INVENTION

This invention relates to a hydrocarbon conversion process using a crystalline molecular sieve. Accordingly, one embodiment of the invention is a process for converting a hydrocarbon to a hydroconverted product comprising contacting a hydrocarbon under hydrocarbon conversion conditions with a crystalline molecular sieve having: 1) a three-dimensional microporous framework structure of $ZnO_2$, $PO_2$ and $M'O_2$ tetrahedral units; 2) an intracrystalline pore system; and 3) an empirical formula, on an anhydrous basis, expressed as the ratio of the oxides of:

$$rM_2O:sZnO:tM'O_{n/2}:uP_2O_5$$

where M is at least one alkali metal, M' is a metal selected from the group consisting of magnesium, copper, gallium, silicon, germanium, cobalt, chromium, iron, manganese, titanium and mixtures thereof, n is the valence of M' and has a value of +2, +3, or +4, r, s, t and u are defined by the following equations:

| 1) when n = +2 and | |
|---|---|
| a) t + s = 2.0 then | b) $2.0 < t + s \leq 3.0$ then |
| t = 0.02 to 1.98 | t = 0.02 to 2.98 |
| s = 1.98 to 0.02 | s = 2.98 to 0.02 |
| r = 0.80 to 1.20 | r = 0.80 to 1.20 |
| u = 0.98 to 1.02 | u = 0.98 to 1.02; |
| 2) when n = +3 and | |
| a) t + s = 2.0 then | b) $2.0 < t + s \leq 3.0$ then |
| t = 0.02 to 1.98 | t = 0.02 to 1.98 |
| s = 1.98 to 0.02 | s = 2.98 to 1.02 |
| r = 0.99 to 0.01 | r = 0.99 to 0.01 |
| u = 0.98 to 1.02 | u = 0.98 to 1.02; |
| 3) when n = +4 and | |
| a) t/2 + s = 2.0 then | b) $2.0 < t/2 + s \leq 3.5$ then |
| t = 0.04 to 3.96 | t = 0.04 to 3.96 |
| s = 1.98 to 0.02 | s = 2.98 to 0.02 |
| r = 0.99 to 0.01 | r = 0.99 to 0.01 |
| u = 0.99 to 0.01 | u = 0.99 to 0.01. |
| 3) when n = +4 and | |
| a) t/2 + s = 2.0 then | b) $2.0 < t/2 + s \leq 3.5$ then |
| t = 0.04 to 3.96 | t = 0.04 to 3.96 |
| s = 1.98 to 0.02 | s = 2.98 to 0.02 |
| r = 0.99 to 0.01 | r = 0.99 to 0.01 |
| u = 0.99 to 0.01 | u = 0.99 to 0.01 |

Another embodiment of the invention is a process for convening a hydrocarbon to a hydroconverted product comprising contacting a hydrocarbon under hydrocarbon conversion conditions with a crystalline molecular sieve having: 1) a three-dimensional microporous framework structure of $ZnO_2$, $PO_2$ and $M'O_2$ tetrahedral units; 2) an intracrystalline pore system; and 3) an empirical formula, on an anhydrous basis, expressed as the ratio of the oxides of:

$$rM_2O:sZnO:tM'O_{n/2}:uP_2O_5$$

where M is at least one alkali metal, M' is a metal selected from the group consisting of magnesium, copper, gallium, aluminum, silicon, germanium, cobalt, chromium, iron, manganese, titanium and mixtures thereof, n is the valence of M' and has a value of +2, +3, or +4, r, s, t and u are defined by the following equations:

| 1) when n = +2 and | |
|---|---|
| a) t + s = 2.0 then | b) $2.0 < t + s \leq 3.0$ then |
| t = 0.02 to 1.98 | t = 0.02 to 2.98 |
| s = 1.98 to 0.02 | s = 2.98 to 0.02 |
| r = 0.80 to 1.20 | r = 0.80 to 1.20 |
| u = 0.98 to 1.02 | u 0.98 to 1.02; |
| 2) when n = +3 and | |
| a) t + s = 2.0 and M' is not $Al^{+3}$, then | b) t + s = 2.0 and M' is $Al^{+3}$ then |
| t = 0.02 to 1.98 | t = 0.01 to 0.56 |
| s = 1.98 to 0.02 | s = 1.99 to 1.44 |
| r = 0.99 to 0.01 | r = 0.99 to 0.72 |
| u = 0.98 to 1.02 | u = 0.98 to 1.02; |
| c) $2.0 < t + s < 3.0$ then | |
| t = 0.02 to 1.98 | |
| s = 2.98 to 1.02 | |
| r = 0.99 to 0.01 | |
| u = 0.98 to 1.02; | |
| 3) when n = +4 and | |
| a) t/2 + s = 2.0 then | b) $2.0 < t/2 + s \leq 3.5$ then |
| t = 0.04 to 3.96 | t = 0.04 to 3.96 |
| s = 1.98 to 0.02 | s = 2.98 to 0.02 |
| r = 0.99 to 0.01 | r = 0.99 to 0.01 |
| u = 0.99 to 0.01 | u = 0.99 to 0.01. | the crystalline molecular sieve characterized in that it has the structure of zeolite ABW or has the structure characterized by the x-ray diffraction pattern, d-spacings and intensities, set forth in Table A.

TABLE A

| 2Θ | d (Å) | Relative Intensity |
|---|---|---|
| 11.60–11.72 | 7.55–7.63 | vs |
| 16.46–16.60 | 5.35–5.39 | w |
| 20.20–20.34 | 437–4.40 | m |
| 23.39–23.32 | 3.78–3.80 | w |
| 28.76–28.89 | 3.09–3.10 | vs |
| 33.34–33.48 | 2.68–2.69 | w–m |
| 34.91–35.06 | 2.56–2.57 | w |
| 35.43–35.56 | 2.52–2.53 | m |
| 37.42–37.56 | 2.39–2.40 | w–m |
| 39.32–39.47 | 2.28–2.29 | w |
| 41.14–41.30 | 2.19 | w |
| 44.62–44.76 | 2.02–2.03 | w |
| 47.88–48.06 | 1.89–1.96 | w |
| 49.45–49.61 | 1.84 | w |
| 50.98–51.16 | 1.79 | w |
| 53.96–54.15 | 1.70–1.69 | w. |

These and other objects and embodiments of the invention will become more apparent after a more detailed description of the invention.

DETAILED DESCRIPTION OF THE INVENTION

As stated, the instant invention relates to a hydrocarbon conversion process using a novel crystalline molecular sieve. The crystalline molecular sieves of the instant invention have a chemical composition which is represented on an anhydrous basis by the empirical formula:

$$rM_2O:sZnO:tM'O_{n/2}:uP_2O_5$$

where M is at least one alkali metal such as lithium, sodium, potassium, rubidium and cesium, M' is a metal selected from the group consisting of magnesium, copper, gallium, aluminum, silicon, germanium, cobalt, chromium, iron, manganese, titanium and mixtures thereof, and n is the valence of M' and has a value of +2, +3 or +4. The values of r, s, t and u will vary over different ranges depending on whether the metal (M') which is incorporated into the framework has a +2, +3 or +4 charge. There is also another factor to consider, which is whether there is a stoichiometric amount of Zn+M'(1:1(Zn+M'):P) or an excess amount.

If a zinc phosphate molecular sieve is represented by the empirical formula $$r_oM_2O:s_oZnO:u_oP_2O_5$$

then the amount of Zn+M' in a zinc phosphate molecular sieve having incorporated M' must be equal to $s_o$ or $t+s=s_o$. However, when $n=+4$, the equation is $t/2+s=s_o$ because usually half of the +4 metal goes into a zinc position while half of it goes into a phosphorus position.

Thus, for the stoichiometric case, i.e., 1:1 Zn:P, $s_o=2$. However, it has been found that excess Zn can be present (the excess zinc is in the framework) and thus $2<s_o<3.0$. This gives us the following cases to consider:

1) $t+s=2.0$ and

2) $2.0<t+s\leq3.0$.

When $n=+4$ the equations become

1) $t/2+s=2.0$ and

2) $2.0<t/2+s\leq3.5$.

The value of $t/2+s$ can vary up to 3.5 because the $M^{+4}$ metal does not have to substitute equally into the zinc and phosphorus positions.

Accordingly, when $n=+2$ and $t+s=2.0$ then $t=0.02$ to 1.98, $s=1.98$ to 0.02, $r=0.80$ to 1.20 and $u=0.98$ to 1.02. For the case of excess zinc, i.e., $2.0<t+s\leq3.0$, $t=0.02$ to 2.98, $s=2.98$ to 0.02, $r=0.80$ to 1.20 and $u=0.98$ to 1.02.

When $n=+3$ and $t+s=2.0$ there is another factor to consider, namely whether M' is Al or other metals. When M' is $Al^{+3}$ then $t=0.01$ to 0.56, $s=1.99$ to 1.44, $r=0.99$ to 0.72 and $u=0.98$ to 1.02. In the case where M' is not $Al^{+3}$ then $t=0.02$ to 1.98, $s=1.98$ to 0.02, $r=0.99$ to 0.01 and $u=0.98$ to 1.02. Regardless of whether M' is Al or another +3 metal, when $2.0<t+s<3.0$, then $t=0.02$ to 1.98, $s=2.98$ to 1.02, $r=0.99$ to 0.01 and $u=0.98$ to 1.02. It should be noted that as the concentration of +3 framework atoms increase, the total charge on the framework decreases and therefore a smaller amount of alkali cation is required to balance the charge.

In the case where $n=+4$ and $t/2+s=2.0$, then $t=0.04$ to 3.96, $s=1.98$ to 0.02, $r=0.99$ to 0.01 and $u=0.99$ to 0.01. For the excess zinc case, i.e., $2.0<t/2+s\leq3.5$, $t=0.04$ to 3.96, $s=2.98$ to 0.02, $r=0.99$ to 0.01 and $u=0.99$ to 0.01.

The molecular sieves of this invention are characterized in that they have a three-dimensional microporous framework structure of $ZnO_2$, $PO_2$ and $M'O_2$ tetrahedral units. Another characteristic of the instant molecular sieves is that they have an intracrystalline pore system whose pore openings can range from about 2 to about 10 Angstroms. Like other molecular sieves, the instant metallo-zinc phosphate molecular sieves can reversibly adsorb water while retaining their crystal structure, i.e., their essential framework topology. By essential framework topology is meant the spatial arrangement of the Zn—O, P—O and M'—O bond linkages. No change in the framework topology indicates that there is no disruption of these primary bond linkages.

One way to show that the M' metals have been incorporated into the framework of the molecular sieves is to look at the thermal and hydrothermal stability of the molecular sieves. The variation of thermal and hydrothermal stability of microporous materials with their framework charge density is well known in the art. The thermal stability of aluminosilicate zeolites containing a given charge balancing cation is closely correlated with the $SiO_2/Al_2O_3$ ratio, which is a compositional measure of the negative framework charge density of the zeolite material. As the $SiO_2/Al_2O_3$ ratio increases, the framework charge density of a zeolite decreases.

We have conducted dilatometric studies on the lithium forms of zeolites with the faujasite structure. Dilatometer data, which display linear shrinkage of zeolite powder compacts as a function of temperature, indicate the temperatures where the zeolite structures collapse to non-microporous materials. The $SiO_2/Al_2O_3$ ratios of the lithium zeolites that were studied by dilatometry were 2.0, 3.5, 6.5, 12.0, and 18.0. The measured temperatures of structure collapse for the above series of zeolites were 700° C., 760° C., 850° C., 920° C., and 950° C. respectively. It is clear from this data that the thermal stabilities of zeolites are directly related to the $SiO_2/Al_2O_3$ ratios, and therefore the framework charge densities of the zeolites. The zeolites become more thermally stable as their negative framework charge densities decrease.

It is therefore expected that as the framework charge densities of microporous metal zinc phosphates decrease by the framework incorporation of +3 and/or +4 metals, the thermal stabilities of the materials should increase. Conversely, the incorporation of +2 metals into the framework of zinc metal phosphates should not decrease the framework charge density nor increase the thermal stabilities of the materials. This effect is precisely what is observed and is shown in detail in the following examples.

The instant metallo-zinc phosphate molecular sieves are prepared by aqueous precipitation or hydrothermal crystallization of a reaction mixture prepared by combining a reactive source of phosphorus, zinc, one or more M' metal, at least one alkali metal and water. Generally any form of phosphorus acid or phosphorus oxides, phosphates and phosphites can be used. Specific examples of the phosphorus sources which can be used in this invention are orthophosphoric acid, pyrophosphoric acid, alkali phosphates, sodium metaphosphate, and zinc orthophosphate. The zinc source can be any zinc salt, zinc oxide or zinc metal. Specific examples of the zinc salts which can be used in this invention are zinc acetate, zinc chloride, zinc hydroxide and zinc orthophosphate. The source of the M' metal include the halide, acetate, nitrate, oxide, alkoxide and carbonate compound. Specific examples are magnesium chloride, copper chloride, gallium chloride, germanium chloride, cobalt chloride, chromium chloride, iron chloride, manganese chloride, titanium isopropoxide, silica, copper nitrate, magnesium nitrate, gallium nitrate, germanium ethoxide, cobalt nitrate, chromium nitrate, iron nitrate, manganese nitrate, aluminum ethoxide and aluminum isopropoxide. Finally, sources of the alkali metals include the halide, acetate, nitrate, carbonate and hydroxide salts. Specific examples are sodium chloride, sodium nitrate, sodium acetate, sodium carbonate, sodium hydroxide, lithium chloride, lithium nitrate, lithium carbonate, lithium hydroxide, rubidium chloride, rubidium nitrate, rubidium carbonate, rubidium hydroxide, cesium chloride, cesium nitrate, cesium carbonate, cesium hydroxide, potassium chloride, potassium nitrate, potassium carbonate, potassium hydroxide.

Generally, the hydrothermal process used to prepare the metallo-zinc phosphate molecular sieves of this invention involves forming a reaction mixture which in terms of molar ratios of the oxides is expressed by the formula:

$$xM_2O:yZnO:zM'O_{n/2}:P_2O_5:aH_2O.$$

where x ranges from greater than 1 to about 5.5, y ranges from about 0.02 to about 3.0, z ranges from about 0.02 to about 5.00, and a ranges from about 20 to about 500. The individual reactants are added to a vessel which is inert to the reactants.

It is also necessary to adjust the pH of the mixture to a value of about 4 to about 13. Preferably the pH should be from about 8 to about 12. The pH of the mixture can be controlled by using the hydroxide salt of the alkali metal or by adding an organic base or both. The organic bases which can be used are generally the amines and quaternary ammonium compounds.

The quaternary ammonium compounds are represented by the formula $R_4N^+$ where R is an alkyl group containing from 1 to 8 carbon atoms or an aryl group. Any of the mono-, di-and tri-amines can be used. Any one amine or quaternary ammonium compound may be used or any combination of amines and quaternary ammonium compounds can be used. Illustrative examples of these bases are: tetramethylammonium hydroxide, tetraethylammonium hydroxide, tetrapropylammonium hydroxide, tetrabutylammonium hydroxide, tetrapentylammonium hydroxide, di-n-propylamine, ethylbutylamine, tripropyl-amine, triethylamine, triethanolamine, piperidine, cyclohexylamine, 2-methyl-pyridine, N,N-dimethylbenzylamine, N,N-dimethylethanolamine, choline, N,N'-dimethylpiperazine, 1,4-diazabicyclo(2,2,2,)octane, N-methyldiethanolamine, N-methylethanolamine, N-methylpiperidine, 3-methylpiperidine, N-methylcyclohexylamine, 3-methylpyridine, 4-methylpyridine, quinuclidine, N,N'-dimethyl-1,4-diazabicyclo(2,2,2,)octane ion, di-n-butylamine, neopentylamine, di-n-pentylamine, diisopropylamine, t-butylamine, ethylenediamine, pyrrolidine, and 2-imidazolidone.

Having formed the reaction mixture, it is next reacted at a temperature of about 0° to about 200° C. for a period of about 2 seconds to about 120 hours. The reaction may be carded out under atmospheric pressure or the reaction vessel may be sealed and the reaction run at autogenous pressure. In a preferred method the temperature is from about 20° to about 150° C. and the time required to crystallize the product is from about 2 seconds to about 60 hours. It is preferred that the ratio of oxides in the reaction mixture be in the range of x=2 to 4, y=1 to 3, z=0.2 to 2.98, a=100-500.

As will be shown in detail in the examples, the metallo-zinc phosphate molecular sieves of this invention can form at a much more rapid rate and at a lower temperature than other oxide molecular sieves. These novel properties may allow for the low cost commercial production of certain metallo-zinc phosphate materials by precipitation at low temperatures.

One function of the alkali metal is to act as a structure directing agent. However, not all the alkali metals which can be used to prepare certain species of metallo-zinc phosphates are suitable for the preparation of all members of the generic class. The relationship of specific alkali metals to the individual product species is apparent from the illustrative examples set forth herein. Mixtures of the alkali metals can also be used as structure directing agents. Again the mixtures may provide some structures but not necessarily all the structures or members of the generic class.

Since the alkali metals are acting as structure directing agents, when the metallo-zinc phosphate molecular sieve is synthesized, a portion of the alkali metal will be present in the pores of the molecular sieve. Once the molecular sieve is formed, the alkali metal or metals within the pores of the sieve act as a counter ion to the negative framework charge. If it is desirable to have a metallo-zinc phosphate molecular sieve substantially free of alkali metal cations, the alkali metal/metals may be replaced by hydronium or ammonium ions by ion exchange or other techniques known in the art. Additionally, if a different alkali metal is desired, then ion exchange can be used to substitute one alkali metal for another alkali metal. Ion exchange can be used to substitute other metals in place of the alkali metals. Thus, calcium, magnesium, barium, strontium, i.e., alkaline earth metals, and zinc can be ion exchanged. The ion exchange does not have to be a complete ion exchange, but usually at least 50% of the initial alkali metal is exchanged for the desired cation. It should be pointed out that because of the framework charge, some counter ion must always be present.

As stated, the metallo-zinc phosphate molecular sieves of this invention have a high framework charge and a high charge gradient. Because of their high framework charge and high charge gradient, the metallo-zinc phosphate molecular sieves of this invention may be used to separate mixtures of molecular species. If water is present within the pores of the molecular sieve, then the molecular sieve must be activated in order to remove at least a portion of the water. This can be done by means well known in the art such as heating at a temperature of about 100° to about 400° C. or subjecting the sample to a high vacuum.

The crystalline materials of this invention are capable of separating mixtures of molecular species based on the molecular size (kinetic diameters) or on the degree of polarity of the molecular species. When the separation of molecular species is based on molecular size, the crystalline microporous material is chosen in view of the dimensions of its pores such that at least the smallest molecular species of the mixture can enter the intracrystalline void space while at least the largest species is excluded. The kinetic diameters of various molecules such as oxygen, nitrogen, carbon dioxide, carbon monoxide are provided in D. W. Breck, ZEOLITE MOLECULAR SIEVES, John Wiley and Sons (1974) p. 636.

When the separation is based on degree of polarity, it is generally the case that the more hydrophilic crystalline material of this invention will preferentially adsorb the more polar molecular species of a mixture having different degrees of polarity even though both molecular species can communicate with the pore system of the crystalline material. For example water, which is more polar, will be preferentially adsorbed over common hydrocarbon molecules such as paraffins, olefins, etc. Thus, the crystalline materials of this invention can be used as desiccants in such adsorption separation/purification processes as natural gas drying, cracked gas drying, etc.

If one of the molecular species, e.g., water, is a small impurity, the separation may be effected in the conventional manner by simply passing the stream to be treated through a bed of the particular crystalline material desired. As the operation of the process continues, there develops in the bed a so-called "front" between the material loaded with the impurity, e.g., water, and the material not so loaded. This front moves through the bed in the direction of gas flow. Before the front reaches the downstream end of the bed, the bed is regenerated by cutting off the flow of feed stream and passing through the bed a purge gas which (usually at a temperature of about 50°-150° C.) desorbs the impurity, e.g., water, from the bed. If the purge gas is adsorbed on the bed, this gas can be removed by passing one or two bed volumes of the feed stream through the bed.

If the concentration of one of the species in the mixture is large, e.g., several percents, other conventional techniques, such as pressure swing adsorption (PSA) and thermal swing adsorption may be used. Such techniques are well known to those skilled in the separation art. See, e.g., U.S. Pat. Nos. 4,723,966, 4,589,888, and 4,398,926. For example, a pressure swing adsorption process will operate at a temperature and pressure sufficient to effect the adsorption and desorption of the component or molecular specie which one wants to remove. Typically the temperature is preferably maintained in the range of about −50° to 100° C. and preferably from about 0° to 50° C. The pressure during adsorption can vary from about 0.2 psia (1.4 kPa) to about 1500 psia (10,342 kPa), preferably from about 50 psia (344 kPa) to about 500 psia (3,447 kPa) and more preferably from about 75 psia (517 kPa) to about 350 psia (2,413 kPa). The pressure during desorption is lower than during adsorption and effective to cause desorption of the adsorbed component. The range of this pressure is from about 0.1 torr (1.3 Pa) to 150 psia (1,034 kPa), preferably from about 0.1 torr (1.3 Pa) to 15 psia (103 kPa) and more preferably from about 0.1 torr (1.3 Pa) to about 250 torr (333 Pa). The cyclic process can comprise additional adsorption and regeneration steps as well as intermediate depressurization and purging steps.

The crystalline microporous compositions of the present invention either as synthesized or after calcination can be used as catalysts or catalyst supports in a hydrocarbon conversion process. Hydrocarbon conversion processes are well known in the art and include cracking, hydrocracking, alkylation of both aromatics and isoparaffin, isomerization, polymerization, reforming, hydrogenation, dehydrogenation, transalkylation, dealkylation, hydration, dehydration, hydrotreating, hydrodenitrogenation, hydrodesulfurization, methanation and syngas shift process. Specific reaction conditions and the types of feeds which can be used in these processes are set forth in U.S. Pat. Nos. 4,310,440 and 4,440,871 which are incorporated by reference. Preferred hydrocarbon conversion processes are those in which hydrogen is a component such as hydrotreating or hydrofining, hydrogenation, hydrocracking, hydrodenitrogenation, hydrodesulfurization, etc.

Specific conditions for the above-named reactions are well known in the art and generally depend on the type of hydrocarbon to be converted. Thus, the instant compositions which may contain a hydrogenation promoter such as platinum or palladium can be used to hydrocrack heavy petroleum residual stocks, cyclic stocks and other hydrocrackable charge stocks at temperatures in the range of 400° to 1200° F. (204°-649° C.), preferably between 600° and 950° F. (316°-510° C.). Reaction pressures are in the range of atmospheric to about 3,500 psig (24,132 kPa g), preferably between 200 and 3000 psig (1379–20,685 kPa g). Contact times usually correspond to liquid hourly space velocities (LHSV) in the range of about 0.1 hr$^{-1}$, preferably between about 0.2 and 3 hr$^{-1}$. Hydrogen circulation rates are in the range of 1,000 to 50,000 standard cubic feet (scf) per barrel of charge (178–8,888 std. m$^3$/m$^3$), preferably between 2,000 and 30,000 scf per barrel of charge (355–5,333 std. m$^3$/m$^3$). Suitable hydrotreating conditions are generally within the broad ranges of hydrocracking conditions set out above.

The catalyst compositions employed in hydrocracking are also suitable for use in reforming processes in which the hydrocarbon feedstocks contact the catalyst at temperatures of from about 700° F. to 1000° F. (371° C. to 538° C.), hydrogen pressure of from 100 to 500 psig (0.791 to 3.448 MPa), LHSV values in the range of 0.1 to 10 and hydrogen to hydrocarbon molar ratios in the range of 1 to 20, preferably between 4 and 12.

Catalytic cracking processes are preferably carried out with one instant composition using feedstocks such as gas oils, heavy naphthas, deasphalted crude oil residua, etc., with gasoline being the principal desired product. Temperature conditions of 850° to 1100° F. (454° to 593° C.), LHSV values of 0.5 to 10 and pressure conditions of from about 0 to 50 psig (101 to 446 kPa) are suitable.

Dehydrocyclization reactions employing paraffinic hydrocarbon feedstocks, preferably normal paraffins having more than 6 carbon atoms, to form benzene, xylenes, toluene and the like are carried out using essentially the same reaction conditions as for catalytic cracking. For these reactions, it is preferred to use the instant compositions in conjunction with a Group VIII non-noble metal cation such as cobalt and nickel.

In catalytic dealkylation wherein it is desired to cleave paraffinic side chains from aromatic nuclei without substantially hydrogenating the ring structure, relative high temperature in the range of about 800°-1000° F. (427°-538° C.) are employed at moderate hydrogen pressures of about 300–1000 psig (2.17–6.895 MPa), other conditions being similar to those described above for catalytic hydrocracking. Preferred catalysts are of the same type described above in connection with catalytic dehydrocyclization. Particularly desirable dealkylation reactions contemplated herein include the conversion of methylnaphthalene to naphthalene and toluene and/or xylenes to benzene.

Isomerization reactions are carried out under conditions similar to those described above for reforming, using somewhat more acidic catalysts. Olefins are preferably isomerized at temperatures of 500°–900° F. (260°–482° C.), while paraffins, naphthenes and alkyl aromatics are isomerized at temperatures of 700°–1000° F. (371°–538° C.). Particularly desirable isomerization reactions contemplated herein include the conversion of n-heptene and/or n-octane to isoheptanes, iso-octanes, butane to iso-butane, methylcyclopentane to cyclodexane, meta-xylene and/or orthoxylene to paraxylene, 1-butene to 2-butene and/or isobutene, n-hexane to isohexene, cyclohexene to methylcyclopentene, etc. The preferred form of the catalyst is a combination of the instant composition with polyvalent metal compounds (such as sulfides) of metals of Group II-A, Group II-B and rare earth metals. For alkylation and dealkylation processes the instant compositions having pores of at least 5 Å are preferred. When employed for dealkylation of alkyl aromatics, the temperature is usually at least 350° F. (177° C.) and ranges up to a temperature at which substantial cracking of the feedstock or conversion products occurs, generally up to about 700° F. (371° C.). The temperature is preferably at least 450° F. (232° C.) and not greater than the critical temperature of the compound undergoing dealkylation. Pressure conditions are applied to retain at least the aromatic feed in the liquid state. For alkylation the temperature can be as low as 250° F. (121° C.) but is preferably at least 350° F. (177° C.). In the alkylation of benzene, toluene and xylene, the preferred alylating agents are olefins such as ethylene and propylene.

The catalysts that are useful for hydrogenation, i.e., those containing hydrogenation promoters are also useful in hydroisomerization processes in which feedstocks such as normal paraffins are converted to saturated branched chain isomers. Hydroisomerization is carried out at a temperature of from about 200° F. to 600° F. (93° C. to 316° C.), preferably 300° F. to 550° F. (149° C. to 288° C. with an LHSV value of from about 0.2 to 1.0. Hydrogen (H) is supplied to the reactor in admixture with the hydrocarbon (Hc) feedstock in molar proportions (H/Hc) of between 1 and 5.

At somewhat higher temperatures, i.e., from about 650° F. to 1000° F. (343° C. to 538° C.), preferably 850° F. to 950° F. (454° C. to 510° C.) and usually at somewhat lower pressures within the range of about 15 to 50 psig (205 to 446 kPa), the same catalyst compositions are used to hydroisomerize normal paraffins. Preferably the paraffin feedstock comprises normal paraffins having a carbon number range of $C_7$–$C_{20}$. Contact time between the feedstock and the catalyst is generally relatively short to avoid undesirable side reactions such as olefin polymerization and paraffin cracking. LHSV values in the range of 0.1 to 10, preferably 1.0 to 6.0 are suitable.

Other reactions may be catalyzed by these crystalline microporous compositions, including base-catalyzed side chain alkylation of alkylaromatics, aldol condensations, olefin double bond isomerization and isomerization of acetylenes, alcohol dehydrogenation, and olefin dimerization and oligomerization. Some of the reaction conditions and types of feeds that can be used in these processes are set forth in U.S. Pat. No. 5,015,796 and in H. Pines, THE CHEMISTRY OF CATALYTIC HYDROCARBON CONVERSIONS, Academic Press (1981) pp. 123–154 and references contained therein, which are incorporated by reference.

The structure of the metallo-zinc phosphate sieves of this invention was determined by X-ray analysis. The X-ray patterns were obtained using standard X-ray powder diffraction techniques. The radiation source was a high-intensity, copper target, X-ray tube operated at 50 Kv and 40 ma. The diffraction pattern from the copper K-alpha radiation and graphite monochromator can be suitably recorded by an X-ray spectrometer scintillation counter, pulse height analyzer and strip chart recorder. Hat compressed powder samples were scanned at 2° (2 theta) per minute, using a two second time constant. Interplanar spacings (d) in Angstrom units were obtained from the position of the diffraction peaks expressed as $2\theta$ where $\theta$ is the Bragg angle as observed on the strip chart. Intensities were determined from the heights of diffraction peaks after subtracting background, "$I_o$" being the intensity of the strongest line or peak, and "I" being the intensity of each of the other peaks.

Alternatively, the X-ray patterns can be obtained from the copper K-alpha radiation by use of computer based techniques using a Siemens D-500 X-ray powder diffractometer, Siemens Type K-805 X-ray sources, available from Siemens Corporation, Cherry Hill, N.J., with appropriate computer interface.

As will be understood by those skilled in the art the determination of the parameter 2 theta is subject to both human and mechanical error, which in combination can impose an uncertainty of about ±0.4° on each reported value of 2 theta. This uncertainty is, of course, also manifested in the reported values of the d-spacings, which are calculated from the 2 theta values. This imprecision is general throughout the art and is not sufficient to preclude the differentiation of the present crystalline materials from each other and from the compositions of the prior art. In some of the X-ray patterns reported, the relative intensities of the d-spacings are indicated by the notations vs, s, m, and w which represent very strong, strong, medium, and weak, respectively. In terms of $100 \times I/I_o$, the above designations are defined as w=0–15; m=15–60; s=60–80 and vs=80–100.

In certain instances the purity of a synthesized product may be assessed with reference to its X-ray powder diffraction pattern. Thus, for example, if a sample is stated to be pure, it is intended only that the X-ray pattern of the sample is free of lines attributable to crystalline impurities, not that there are no amorphous materials present. To allow for ready reference, the different structure types in the following examples have been given arbitrary numbers such as structure type 1. Thus potassium zinc copper phosphate-3 and potassium zinc manganese phosphate-3 are the same structure type. A material that has structure type 3 has at least the x-ray diffraction lines set forth in Table A.

TABLE A

| Structure Type 3 | | |
|---|---|---|
| $2\theta$ | d (Å) | Relative Intensity |
| 11.60–11.72 | 7.55–7.63 | vs |

TABLE A-continued

Structure Type 3

| 2Θ | d (Å) | Relative Intensity |
|---|---|---|
| 16.46–16.60 | 5.35–5.39 | w |
| 20.20–20.34 | 4.37–4.40 | m |
| 23.39–23.52 | 3.78–3.80 | w |
| 28.76–28.89 | 3.09–3.10 | vs |
| 33.34–33.48 | 2.68–2.69 | w-m |
| 34.91–35.06 | 2.56–2.57 | w |
| 35.43–35.56 | 2.52–2.53 | m |
| 37.42–37.56 | 2.39–2.40 | w-m |
| 39.32–39.47 | 2.28–2.29 | w |
| 41.14–41.30 | 2.19 | w |
| 44.62–44.76 | 2.02–2.03 | w |
| 47.88–48.06 | 1.89–1.96 | w |
| 49.45–49.61 | 1.84 | w |
| 50.98–51.16 | 1.79 | w |
| 53.96–54.15 | 1.70–1.69 | w |

The metallo-zinc phosphate sieves of this invention can also have the sodalite or zeolite ABW structure.

In order to more fully illustrate the variety of species to be derived from the instant invention, the following examples are set forth. It is to be understood that the examples are only by way of illustration and are not intended as an undue limitation on the broad scope of the invention as set forth in the appended claims.

EXAMPLE 1

Preparation Of A Potassium Germanium Zinc Phosphorous Oxide

A reaction mixture was prepared by adding a pre-mixed solution of 26.9 g of KOH dissolved in 142.3 g distilled water to another pre-mixed solution of 8.2 g $Ge(OC_2H_3)_4$ dissolved in 141.8 g distilled water while stirring to yield a clear solution. To this solution, 18.5 g of 85% $H_3PO_4$ was added followed by the addition of another pre-mixed solution of 17.5 g $ZnCl_2$ dissolved in 141.7 g distilled water while stirring. The addition of the $ZnCl_2$ in water solution caused a fluffy white precipitate to develop which stirred into a smooth pourable gel with a pH of 7.1. The composition of the reaction mixture expressed in anhydrous oxide ratios of the reagents was:

$3.0\ KOH:0.4\ GeO_2:1.6\ ZnO:P_2O_5$

To the above described reaction mixture, 81.4 g of 25% tetramethylammonium hydroxide in $H_2O$ solution was added dropwise while stirring to adjust the pH to 12.02, giving a final composition of:

$2.79\ TMAOH:3\ K_2O:0.4\ GeO_2:1.6\ ZnO:P_2O_5:342\ H_2O$

The reaction mixture was split into five portions and digested as follows: portion A was the initial gel immediately following make-up, portion B was digested with stirring for 24 hours at ambient temperature, portion C was quiescently digested for 24 hours at 65° C., portion D was quiescently digested for 24 hours at 80° C., and portion E was digested quiescently for 24 hours. All digestions were carried out in sealed Teflon TM bottles. The solid reaction products were isolated by filtration, washed with distilled water, and dried at room temperature.

The X-ray powder diffraction patterns of all of the above products were essentially identical. Chemical analysis of this product A revealed the presence of 16.4 wt % $K_2O$, 41.6 wt % ZnO, 22.25 wt % $P_2O_5$, 4.78 wt % $GeO_2$, and 14.0 wt % LOI, giving a product composition on an anhydrous basis of:

$1.11\ K_2O:0.30\ GeO_2:3.25\ ZnO:1.00\ P_2O_5$

The x-ray powder diffraction pattern of this product was characterized by the data shown in Table 1.

TABLE 1

| 2Θ | d (Å) | 100 × $I/I_o$ |
|---|---|---|
| 11.65 | 7.59 | 100 |
| 12.85 | 6.89 | 2 |
| 16.51 | 5.37 | 5 |
| 20.26 | 4.38 | 29 |
| 23.44 | 3.80 | 13 |
| 28.80 | 3.10 | 92 |
| 33.37 | 2.68 | 13 |
| 34.94 | 2.57 | 11 |
| 35.46 | 2.53 | 34 |
| 37.44 | 2.40 | 15 |
| 39.35 | 2.29 | 10 |
| 41.17 | 2.19 | 5 |
| 44.64 | 2.03 | 7 |
| 45.90 | 1.98 | 2 |
| 47.88 | 1.90 | 2 |
| 49.47 | 1.84 | 6 |
| 51.00 | 1.79 | 1 |
| 52.14 | 1.75 |  |
| 52.47 | 1.74 | 1 |
| 53.98 | 1.70 | 6 |

Scanning Electron Microscopy (SEM) of portion C (24 h at 65° C. quiescent digest) showed the sample morphology to be cube-like, loose and in aggregates. EDAX spot probes on two clean cubes indicate the presence of germanium.

DTA (Differential Thermal Analysis) on zinc phosphorous oxide compositions were run under identical conditions (6 degrees/min to 800° C. in air). A pure K—Zn—P—O type 3 material exhibited one broad exothermic peak with the maximum at 557° C. The K—Ge—Zn—P—O type 3 material exhibited the same broad exothermic peak, however, there was a noticeable shift in temperature. The portion of K—Ge—Zn—P—O structure type 3 tested exhibited an exothermic peak with the maximum at 576° C. This 19° C. shift in peak temperature indicates an intrinsically higher thermal stability, which is consistent with framework incorporation of Ge to produce a lower framework charge density.

EXAMPLE 2

Preparation Of A Potassium Aluminum Zinc Phosphorous Oxide

A reaction mixture was prepared by adding a solution of 8.2 grams $ZnCl_2$ dissolved in 25.7 grams of distilled water to 8.2 grams aluminum isopropoxide while stirring. This was followed by the addition of a solution of 11.6 grams 85% $H_3PO_4$ diluted in 25.7 grams of distilled water. With continued stirring, a solution of 9.4 grams KOH dissolved in 25.7 grams of distilled water was then added resulting in the following reaction mixture expressed in anhydrous oxide ratios of the reagents:

$1.65\ K_2O:1.2\ ZnO:0.4\ Al_2O_3:P_2O_5$

This reaction mixture was sealed in a Teflon TM bottle and quiescently digested for 24 hours at 100° C. The solid reaction products were isolated by vacuum filtration, washed with distilled water and dried at room temperature. The X-ray powder diffraction pattern indicated the product to be structure type 3 and is characterized by the data in Table 2.

TABLE 2

| 2Θ | d (Å) | 100 × I/I$_o$ |
|---|---|---|
| 11.65 | 7.59 | 98 |
| 14.43 | 6.14 | 8 |
| 16.52 | 5.36 | 6 |
| 19.42 | 4.57 | 4 |
| 19.51 | 4.55 | 4 |
| 20.27 | 4.38 | 30 |
| 20.69 | 4.29 | 10 |
| 23.46 | 3.79 | 13 |
| 28.38 | 3.15 | 37 |
| 28.83 | 3.10 | 100 |
| 32.96 | 2.72 | 9 |
| 33.42 | 2.68 | 19 |
| 34.25 | 2.62 | 4 |
| 34.98 | 2.57 | 14 |
| 35.50 | 2.53 | 33 |
| 37.48 | 2.40 | 17 |
| 39.38 | 2.29 | 9 |
| 40.54 | 2.23 | 9 |
| 41.21 | 2.19 | 7 |
| 44.71 | 2.03 | 7 |
| 47.63 | 1.91 | 3 |
| 47.97 | 1.90 | 4 |
| 49.52 | 1.84 | 6 |
| 50.18 | 1.82 | 3 |
| 51.10 | 1.79 | 12 |
| 54.11 | 1.69 | 6 |

Chemical analysis of the product revealed the presence of 19.3 wt % $K_2O$, 8.98 wt % $Al_2O_3$, 29.8 wt % ZnO, 28.6 $P_2O_5$, and 12.3 wt % LOI, giving a product composition on an anhydrous basis of:

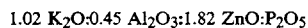

1.02 $K_2O$:0.45 $Al_2O_3$:1.82 ZnO:$P_2O_5$

Scanning Electron Microscopy (SEM) of the sample revealed the morphology to be that of aggregated cubes and/or rhombohedra typical of previously observed zinc phosphorous oxide structure type 3. Energy Dispersive Analysis by X-Ray (EDAX) indicated presence of Al in the appropriate crystals.

EXAMPLE 3

Preparation Of a Potassium Copper Zinc Phosphorous Oxide

A reaction mixture was formed by adding a premixed solution of 51.0 g. potassium hydroxide (KOH) dissolved in 264.4 g distilled water to a second premixed solution of 15.8 g Cu(OAc)$_2$ H$_2$O dissolved in 264.4 g distilled water while stirring. This was followed by the addition of 34.6 g of 85% H$_3$PO$_4$ also with stirring. At this point, a third pre-mixed solution of 43.6 g ZnCl$_2$ dissolved in 264.8 g distilled water was added. With continued stirring, a smooth creamy green/blue just past pourable gel developed. The composition of the reaction mixture expressed in anhydrous oxide ratios of the reagents was:

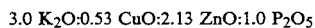

3.0 $K_2O$:0.53 CuO:2.13 ZnO:1.0 $P_2O_5$

The pH of the reaction mixture was increased to 12.1 by addition of 143.8 g of 25 wt % tetramethylammonium hydroxide (TMAOH) in water giving a final composition of:

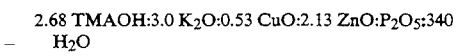

2.68 TMAOH:3.0 $K_2O$:0.53 CuO:2.13 ZnO:$P_2O_5$:340 H$_2$O

The mixture was divided into 11 portions, sealed in Teflon TM bottles and digested as follows; A was the initial gel 10 minutes after make-up. The solids were recovered and washed by vacuum filtration and allowed to dry in ambient air. Portion B and C were both digested at room temperature with stirring for 24 and 72 hours respectively. Portions D and E were both quiescently digested at 65° C. for 24 and 72 hours respectively, while portions F and G were both quiescently digested at 80° C. for 24 and 72 hours respectively. Portions H and J were quiescent digestions at 100° C. for 24 and 72 hours likewise. While portion K was a 24 hour static digest at 150° C., and portion L was a 24 hour static digest at 200° C. The 150° and 200° C. digestions were carried out in Teflon TM lined stainless steel pressure autoclaves. The products were isolated and washed by vacuum filtration and all samples were dried in ambient air.

The X-ray powder diffraction patterns of samples A through J were essentially identical, identifying each sample as a pure structure type 3, and are characterized by the data in Table 3. The X-ray powder diffraction patterns of the remaining samples K (24 h at 150° C.) and L (24 h at 200° C.) showed the major crystalline phase to be structure type 3, a small amount of zinc oxide, JCPDS #36-1451, was present as an impurity.

TABLE 3

| 2Θ | d (Å) | 100 × I/I$_o$ |
|---|---|---|
| 11.68 | 7.58 | 100 |
| 16.54 | 5.36 | 7 |
| 20.29 | 4.38 | 27 |
| 23.46 | 3.79 | 9 |
| 28.83 | 3.10 | 85 |
| 33.41 | 2.68 | 12 |
| 33.72 | 2.66 | 1 |
| 34.48 | 2.60 | 1 |
| 34.99 | 2.56 | 10 |
| 35.50 | 2.53 | 32 |
| 37.49 | 2.40 | 12 |
| 39.39 | 2.29 | 8 |
| 41.21 | 2.19 | 4 |
| 44.68 | 2.02 | 6 |
| 45.89 | 1.98 | 1 |
| 47.98 | 1.90 | 2 |
| 49.55 | 1.84 | 5 |
| 51.07 | 1.79 | 10 |
| 52.26 | 1.75 | 2 |
| 52.57 | 1.74 | 1 |
| 54.05 | 1.70 | 4 |

Chemical analysis of this product revealed the presence of 15.8 wt % $K_2O$, 9.25 wt % CuO, 36.6 wt % ZnO, 24.1 wt % $P_2O_5$, and a LOI of 13.0 wt %, giving a final product composition on an anhydrous basis of:

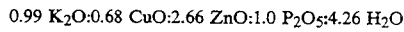

0.99 $K_2O$:0.68 CuO:2.66 ZnO:1.0 $P_2O_5$:4.26 H$_2$O

It should be pointed out that the sum of the moles of CuO and ZnO is greater than 3.0 which excess over 3.0 is accounted for by the presence of extraneous ZnO as shown by x-ray diffraction analysis.

Scanning Electron Microscopy (SEM) revealed the dominant product morphology to be rhombohedra or cubes, which is typical for structure type 3. EDAX indicated the presence of Cu in crystals of the appropriate morphology.

The DTA trace showed a sharp exotherm at 515° C. DTA of a K—Zn—P—O structure type 3 displayed an exotherm at 557° C. This exotherm, which corresponds to structure collapse, had shifted 42° C. with the incorporation of Cu in the structure (from 557° to 515° C.).

17

The lower thermal stability is consistent with framework incorporation of $Cu^{+2}$, which is not as likely as Zn to maintain tetrahedral coordination at elevated temperatures.

EXAMPLE 4

Preparation of a Potassium Magnesium Zinc Phosphorous Oxide

A reaction mixture was prepared by adding a solution of 47.1 KOH dissolved in 246.5 grams distilled water to a dispersion of 4.3 grams $Mg(OH)_2$ in 246.2 grams distilled water while stirring. This was followed by the addition of 32.4 grams 85% $H_3PO_4$. With continued stirring a solution of 40.7 $ZnCl_2$ dissolved in 247.1 grams distilled water was added forming a white precipitate which stirred into a smooth creamy just past pourable reaction mixture with the following composition:

3.0 $K_2O$:0.53 MgO:2.13 ZnO:$P_2O_5$:300 $H_2O$

The reaction mixture was then pH adjusted to 12.0 by the addition of 62.8 grams 25% tetramethylammonium hydroxide (TMAOH) in water solution dropwise while stirring, giving a final composition of:

1.23 TMAOH:3.0 $K_2O$:0.53 MgO:2.13 ZnO:$P_2O_5$: 319 $H_2O$

At this point, the reaction mixture was divided into nine portions labeled A through J. Portion A was the reaction mixture immediately upon make up. The product solids were immediately isolated by vacuum filtration, washed with distilled water and allowed to dry at room temperature. Portions B and C were digested and stirred at room temperature for 24 and 96 hours respectively. Portions D and E were quiescently digested at 65° C. for 24 and 96 hours; portions F and G were digested in the same manner at 80° C., while portions H and J were digested quiescently at 100° C. for 24 and 96 hours. Digestions were carried out in sealed Teflon TM bottles.

X-ray powder diffraction pattern for portion A after filtering, washing and drying indicated an amorphous product, while x-ray powder diffraction patterns for samples B through J indicated structure type 3.

The X-ray powder diffraction pattern of sample H is characterized by the data in Table 4.

TABLE 4

| 2Θ | d (Å) | 100 × I/I$_o$ |
|---|---|---|
| 11.60 | 7.63 | 100 |
| 16.46 | 5.39 | 6 |
| 18.42 | 4.82 | 2 |
| 20.21 | 4.39 | 27 |
| 21.83 | 4.07 | 2 |
| 23.39 | 3.80 | 11 |
| 27.53 | 3.24 | 1 |
| 28.19 | 3.17 | 1 |
| 28.76 | 3.10 | 84 |
| 29.96 | 2.98 | 2 |
| 32.27 | 2.77 | 2 |
| 33.34 | 2.69 | 11 |
| 34.41 | 2.61 | 2 |
| 34.92 | 2.57 | 10 |
| 35.43 | 2.53 | 33 |
| 37.42 | 2.40 | 14 |
| 37.97 | 2.37 | 2 |
| 39.32 | 2.29 | 4 |
| 41.14 | 2.19 | 7 |
| 44.63 | 2.03 | 7 |
| 45.85 | 1.98 | 2 |

18

TABLE 4-continued

| 2Θ | d (Å) | 100 × I/I$_o$ |
|---|---|---|
| 47.89 | 1.90 | 2 |
| 49.45 | 1.84 | 6 |
| 50.98 | 1.79 | 10 |
| 52.14 | 1.75 | 2 |
| 52.41 | 1.75 | 1 |
| 52.54 | 1.74 | 1 |
| 53.96 | 1.70 | 5 |
| 55.41 | 1.66 | 6 |

Chemical analysis of sample H showed the presence of 17.00 wt % $K_2O$, 4.40 wt % MgO, 37.40 wt % ZnO, 27.30 wt % $P_2O_5$ and 12.30 wt % LOI, giving a product composition on an anhydrous basis of:

0.95 $K_2O$:0.58 MgO:2.40 ZnO:1.0 $P_2O_5$

Scanning Electron Microscopy (SEM) of sample J showed a morphology of aggregates of cubes or stacked plates that is typical of previously observed structure type 3. Energy Dispersive Analysis by X-Ray (EDAX) spot probes of both a aggregate of cubes as well as a clean surface of a cube in an aggregate revealed the presence of Mg.

EXAMPLE 5

Preparation of a Potassium Magnesium Zinc Phosphorous Oxide

A reaction mixture was formed by combining a solution of 13.5 grams KOH dissolved in 70.4 grams distilled water with a dispersion of 1.3 grams $Mg(OH)_2$ in 70.3 grams of water while mixing. To this, 9.3 grams of 85% $H_3PO_4$ was added followed by a solution of 11.6 grams of $ZnCl_2$ dissolved in distilled water with continued mixing, resulting in the following reaction composition:

3.0 $K_2O$:2.13 ZnO:0.53 MgO:$P_2O_5$:300 $H_2O$

The pH was increased to 12.02 by addition of 17.1 grams 25 wt % tetramethylammonium hydroxide solution (TMAOH) dropwise while stirring, giving a final composition of:

1.17 TMAOH:3.0 $K_2O$:0.53 MgO:2.13 ZnO:$P_2O_5$:318 $H_2O$

The reaction mixture was split into two portions, sealed in Teflon TM bottles and quiescently digested at 65° C. for 1 hour and 4 hours. The solid reaction products were isolated by vacuum filtration, washed with distilled water, and dried at room temperature.

The x-ray powder diffraction patterns for both samples were essentially identical indicating pure structure type 3. The x-ray powder diffraction patterns of these products are characterized by the data shown in Table 5.

TABLE 5

| 2Θ | d (Å) | 100 × I/I$_o$ |
|---|---|---|
| 11.72 | 7.55 | 100 |
| 16.60 | 5.35 | 5 |
| 18.51 | 4.79 | 1 |
| 18.66 | 4.76 | 2 |
| 20.34 | 4.37 | 31 |
| 23.52 | 3.78 | 11 |
| 28.89 | 3.09 | 94 |
| 33.48 | 2.68 | 12 |
| 35.06 | 2.56 | 12 |

TABLE 5-continued

| 2θ | d (Å) | 100 × I/I$_o$ |
|---|---|---|
| 35.56 | 2.52 | 35 |
| 37.56 | 2.39 | 15 |
| 38.03 | 2.37 | 3 |
| 39.47 | 2.28 | 9 |
| 41.30 | 2.19 | 4 |
| 44.76 | 2.02 | 7 |
| 46.03 | 1.97 | 2 |
| 48.06 | 1.89 | 2 |
| 49.61 | 1.84 | 6 |
| 51.16 | 1.79 | 12 |
| 52.27 | 1.75 | 2 |
| 52.61 | 1.74 | 1 |
| 54.15 | 1.69 | 5 |

Chemical analysis of one of the products revealed the presence of 17.10 wt % K$_2$O, 5.00 wt % MgO, 37.60 wt % ZnO, 26.90 wt % P$_2$O$_5$, and 13.10 wt % LOI, giving a product composition on an anhydrous basis of:

0.95 K$_2$O:0.66 MgO:2.44 ZnO:1.00 P$_2$O$_5$

Scanning Electron Microscopy (SEM) of the sample showed the sample morphology to be cubes/rhombohedra and aggregates thereof, which is typical of other previously observed structure type 3 crystals. Energy Dispersive Analysis by X-Ray (EDAX) indicated the presence of Mg in the crystals of appropriate morphology.

DTA data for K—Mg—Zn—P—O structure type 3 displayed a sharp exotherm with a maximum at 554° C. This particular exotherm corresponds to the crystal collapse, and occurs at about the same temperature observed in the K—Zn—P—O composition of structure type 3 (peak at 557° C.).

EXAMPLE 6

Preparation of a Potassium Aluminum Zinc Phosphorous Oxide

A reaction mixture was prepared by adding a premixed solution of 58.1 grams ZnCl$_2$ dissolved in 163.5 grams of water to 46.2 grams of 50 wt % Al$_2$Cl(OH)$_5$.2 H$_2$O while stirring to form a clear solution. This was followed by the addition of 46.3 grams of 85% H$_3$PO$_4$ diluted in 162.2 grams water while mixing. The reaction mixture remained a clear solution. To this, a premixed solution of 67.4 grams KOH dissolved in 162.4 grams of water was added while mixing, causing a fluffy white precipitate to form which stirred into a just past pourable gel having a pH of 6.05 and a reaction mixture composition of:

3.0 K$_2$O:0.53 Al$_2$O$_3$:2.13 ZnO:P$_2$O$_5$:150 H$_2$O

The pH of the reaction mixture was then increased to 12.03 by addition of 182.1 grams of aqueous 25 wt % tetramethylammonium hydroxide (TMAOH), dropwise while stirring, giving a final composition of:

2.5 TMAOH:3.0 K$_2$O:0.53 Al$_2$O$_3$:2.13 ZnO:P$_2$O$_5$:188 H$_2$O

The reaction mixture was split into seven portions and digested under a variety of conditions. Digestions at 100° C. or less were carded out in sealed Teflon ™ bottles while digestions at 125° and 150° C. were carried out in Teflon ™ lined stainless steel pressure vessels.

The solids from a portion of the initial gel (A) were isolated and washed by vacuum filtration. Two portions of the reaction mixture were stirred at room temperature (B) for 24 hours, and (C) for 72 hours. Another two portions of the mixture were digested for 24 hours quiescently at 65° C. (D) and 100° C. (E). The remaining two portions were digested quiescently at 125° C. and 150° C., respectively, for 24 hours.

X-ray powder diffraction analysis of the solid product A revealed that the major product (>95% of the crystalline material) was structure type 3. Samples B through E were all shown to be crystallographically pure structure type 3 and are characterized by the data in Table 6. Samples F and G (125°, 150° C. digest) were shown to be structure type 3 with a KZnPO$_4$ impurity (JCPDS #34-194).

TABLE 6

| 2θ | d (Å) | 100 × I/I$_o$ |
|---|---|---|
| 11.61 | 7.62 | 100 |
| 16.46 | 5.39 | 4 |
| 20.20 | 4.40 | 22 |
| 23.39 | 3.80 | 9 |
| 28.76 | 3.10 | 65 |
| 33.34 | 2.69 | 9 |
| 34.91 | 2.57 | 7 |
| 35.43 | 2.53 | 24 |
| 37.44 | 2.40 | 9 |
| 39.32 | 2.29 | 6 |
| 41.13 | 2.19 | 8 |
| 44.62 | 2.03 | 4 |
| 45.87 | 1.98 | 1 |
| 47.92 | 1.90 | 1 |
| 49.47 | 1.84 | 4 |
| 51.03 | 1.79 | 7 |
| 52.17 | 1.75 | 1 |
| 52.49 | 1.74 | 1 |
| 53.97 | 1.70 | 3 |
| 55.43 | 1.66 | 4 |

The product which had been digested and stirred for 24 hr at room temperature (B), was subjected to chemical analysis, which revealed the presence of 16.70 wt % K$_2$O, 35.30 wt % ZnO, 6.33 wt % Al$_2$O$_3$, 25.30 wt % P$_2$O$_5$, and 16.20 wt % LOI, giving a product composition in terms of ratio of oxides on an anhydrous basis of:

1.00 K$_2$O:0.35 Al$_2$O$_3$:2.44 ZnO:1.00 P$_2$O$_5$

Scanning Electron Microscopy (SEM) of the same K—Al—Zn—P—O structure type 3 product (B) showed the sample to consist of rhombohedra or cubes and aggregates thereof, which is typical for all previously observed Zn—P—O structure type 3. Energy Dispersive Analysis by X-Ray (EDAX) using both area scans and spot probes of a single clean crystal confirmed the presence of Al in all crystals.

DTA data for K—Al—Zn—P—O structure type 3 displayed a sharp exotherm with a maximum at 615° C. This particular exotherm corresponds to the crystal collapse, and occurs at 58° C. higher than the temperature observed in the K—Zn—P—O composition of structure type 3 (peak at 557° C.).

I claim as my invention:

1. A hydrocarbon conversion process comprising contacting a hydrocarbon under hydrocarbon conversion conditions with a crystalline molecular sieve having: 1) a three-dimensional microporous framework structure of ZnO$_2$, PO$_2$ and M'O$_2$ tetrahedral units; 2) an intracrystalline pore system; and 3) an empirical formula, on an anhydrous basis, expressed as the ratio of the oxides of:

$rM_2O:sZnO:tM'O_{n/2}:uP_2O_5$ where M is at least one alkali metal, M' is a metal selected from the group consisting of magnesium, copper, gallium, silicon, germanium, cobalt, chromium, iron, manganese, titanium and mixtures thereof, n is the valence of M' and has a value of +2, +3, or +4, r, s, t and u are defined by the following equations:

1) when $n = +2$ and a) $t + s = 2.0$ then  b) $2.0 < t + s \leq 3.0$ then $t = 0.02$ to $1.98$   $t = 0.02$ to $2.98$
 $s = 1.98$ to $0.02$   $s = 2.98$ to $0.02$
 $r = 0.80$ to $1.20$   $r = 0.80$ to $1.20$
 $u = 0.98$ to $1.02$   $u = 0.98$ to $1.02$;

2) when $n = +3$ and a) $t + s = 2.0$ then  b) $2.0 < t + s \leq 3.0$ then $t = 0.02$ to $1.98$   $t = 0.02$ to $1.98$
 $s = 1.98$ to $0.02$   $s = 2.98$ to $1.02$
 $r = 0.99$ to $0.01$   $r = 0.99$ to $0.01$
 $u = 0.98$ to $1.02$   $u = 0.98$ to $1.02$;

3) when $n = +4$ and a) $t/2 + s = 2.0$ then  b) $2.0 < t/2 + s \leq 3.5$ then $t = 0.04$ to $3.96$   $t = 0.04$ to $3.96$
 $s = 1.98$ to $0.02$   $s = 2.98$ to $0.02$
 $r = 0.99$ to $0.01$   $r = 0.99$ to $0.01$
 $u = 0.99$ to $0.01$   $u = 0.99$ to $0.01$.

2. The process of claim 1 where the hydrocarbon conversion process is hydrocracking.

3. The process of claim 1 where the hydrocarbon conversion process is hydrotreating.

4. The process of claim 1 where the hydrocarbon conversion process is hydrogenation.

5. The process of claim 1 where the molecular sieve has the structure of sodalite.

6. The process of claim 1 where the molecular sieve has the structure of ABW.

7. The process of claim 1 where the molecular sieve is characterized by the x-ray diffraction pattern which contains at least the d-spacings and intensities set forth in the following Table A:

TABLE A

| 2θ | d (Å) | Relative Intensity |
|---|---|---|
| 11.60–11.72 | 7.55–7.63 | vs |
| 16.46–16.60 | 5.35–5.39 | w |
| 20.20–20.34 | 4.37–4.40 | m |
| 23.39–23.52 | 3.78–3.80 | w |
| 28,76–28,89 | 3.09–3.10 | vs |
| 33.34–33.48 | 2.68–2.69 | w–m |
| 34.91–35.06 | 2.56–2.57 | w |
| 35.43–35.56 | 2.52–2.53 | m |
| 37.42–37.56 | 2.39–2.40 | w–m |
| 39.32–39.47 | 2.28–2.29 | w |
| 41.14–41.30 | 2.19 | w |
| 44.62–44.76 | 2.02–2.03 | w |
| 47.88–48.06 | 1.89–1.96 | w |
| 49.45–49.61 | 1.84 | w |
| 50.98–51.16 | 1.79 | w |
| 53.96–54.15 | 1.70–1.69 | w. |

8. The process of claim 1 characterized in that the M metal in the crystalline molecular sieve has been at least 50% ion exchanged with a cation selected from the group consisting of alkali metals (other than M), hydronium ion, ammonium ion, calcium, magnesium, barium, strontium, zinc and mixtures thereof.

9. A hydrocarbon conversion process comprising contacting a hydrocarbon under hydrocarbon conversion conditions with a crystalline molecular sieve having: 1) a three-dimensional microporous framework structure of $ZnO_2$, $PO_2$ and $M'O_2$ tetrahedral units; 2) an intracrystalline pore system; and 3) an empirical formula, on an anhydrous basis, expressed as the ratio of the oxides of:

$rM_2O:sZnO:tM'O_{n/2}:uP_2O_5$ where M is at least one alkali metal, M' is a metal selected from the group consisting of magnesium, copper, gallium, aluminum, silicon, germanium, cobalt, chromium, iron, manganese, titanium and mixtures thereof, n is the valence of M' and has a value of +2, +3, or +4, r, s, t and u are defined by the following equations:

1) when $n = +2$ and a) $t + s = 2.0$ then  b) $2.0 < t + s \leq 3.0$ then $t = 0.02$ to $1.98$   $t = 0.02$ to $2.98$
 $s = 1.98$ to $0.02$   $s = 2.98$ to $0.02$
 $r = 0.80$ to $1.20$   $r = 0.80$ to $1.20$
 $u = 0.98$ to $1.02$   $u = 0.98$ to $1.02$;

2) when $n = +3$ and a) $t + s = 2.0$ and  b) $t + s = 2.0$ and
 M' is not $Al^{+3}$, then M' is $Al^{+3}$ then $t = 0.02$ to $1.98$   $t = 0.01$ to $0.56$
 $s = 1.98$ to $0.02$   $s = 1.99$ to $1.44$
 $r = 0.99$ to $0.01$   $r = 0.99$ to $0.72$
 $u = 0.98$ to $1.02$   $u = 0.98$ to $1.02$;

c) $2.0 < t + s \leq 3.0$ then $t = 0.02$ to $1.98$
 $s = 2.98$ to $1.02$
 $r = 0.99$ to $0.01$
 $u = 0.98$ to $1.02$;

3) when $n = +4$ and a) $t/2 + s = 2.0$ then  b) $2.0 < t/2 + s \leq 3.5$ then $t = 0.04$ to $3.96$   $t = 0.04$ to $3.96$
 $s = 1.98$ to $0.02$   $s = 2.98$ to $0.02$
 $r = 0.99$ to $0.01$   $r = 0.99$ to $0.01$
 $u = 0.99$ to $0.01$   $u = 0.99$ to $0.01$;

the crystalline molecular sieve characterized in that it has the structure of zeolite ABW or has the structure characterized by the x-ray diffraction pattern, d-spacings and intensities, set forth in Table A:

TABLE A

| 2θ | d (Å) | Relative Intensity |
|---|---|---|
| 11.60–11.72 | 7.55–7.63 | vs |
| 16.46–16.60 | 5.35–5.39 | w |
| 20.20–20.34 | 4.37–4.40 | m |
| 23.39–23.52 | 3.78–3.80 | w |
| 28.76–28.89 | 3.09–3.10 | vs |
| 33.34–33.48 | 2.68–2.69 | w–m |
| 34.91–35.06 | 2.56–2.57 | w |
| 35.43–35.56 | 2.52–2.53 | m |
| 37.42–37.56 | 2.39–2.40 | w–m |
| 39.32–39.47 | 2.28–2.29 | w |
| 41.14–41.30 | 2.19 | w |
| 44.62–44.76 | 2.02–2.03 | w |
| 47.88–48.06 | 1.89–1.96 | w |

TABLE A-continued

| 2Θ | d (Å) | Relative Intensity |
|---|---|---|
| 49.45–49.61 | 1.84 | w |
| 50.98–51.16 | 1.79 | w |
| 53.96–54.15 | 1.70–1.69 | w[.] | to give a converted product.

10. The process of claim 9 where the hydrocarbon conversion process is hydrocracking.

11. The process of claim 9 where the hydrocarbon conversion process is hydrotreating.

12. The process of claim 9 where the hydrocarbon conversion process is hydrogenation.

13. The process of claim 9 characterized in that the M metal in the crystalline molecular sieve has been at least 50% ion exchanged with a cation selected from the group consisting of alkali metals (other than M), hydronium ion, ammonium ion, calcium, magnesium, barium, strontium, zinc and mixtures thereof.

* * * * *

UNITED STATES PATENT AND TRADEMARK OFFICE
CERTIFICATE OF CORRECTION

PATENT NO. : 5,449,450
DATED : September 12, 1995
INVENTOR(S) : ROBERT L. BEDARD It is certified that error appears in the above-identified patent and that said Letters Patent is hereby corrected as shown below:

In column 21, line 31: Delete "." and add --, to give a converted product.--

Signed and Sealed this

Sixteenth Day of January, 1996

Attest:

BRUCE LEHMAN

Attesting Officer

Commissioner of Patents and Trademarks